(12) United States Patent
Aggarwal et al.

(10) Patent No.: US 10,816,945 B2
(45) Date of Patent: *Oct. 27, 2020

(54) HUMAN PRESENCE DETECTION COMMISSIONING TECHNIQUES

(71) Applicant: Osram Sylvania Inc., Wilmington, MA (US)

(72) Inventors: Anant Aggarwal, Waltham, MA (US); Bernhard Siessegger, Unterschleissheim (DE)

(73) Assignee: OSRAM SYLVANIA Inc., Wilmington, MA (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/078,980

(22) Filed: Mar. 23, 2016

(65) Prior Publication Data
US 2016/0202678 A1    Jul. 14, 2016

Related U.S. Application Data

(63) Continuation-in-part of application No. 14/076,372, filed on Nov. 11, 2013.

(Continued)

(51) Int. Cl.
*H04N 7/18* (2006.01)
*G05B 15/02* (2006.01)
(Continued)

(52) U.S. Cl.
CPC .............. *G05B 15/02* (2013.01); *G01V 8/10* (2013.01); *G08B 13/194* (2013.01); *H04N 5/33* (2013.01);
(Continued)

(58) Field of Classification Search
CPC .............. G05B 15/02; G06K 9/00362; G06K 9/00369; G06K 2009/00738;
(Continued)

(56) References Cited

U.S. PATENT DOCUMENTS 6,137,407 A * 10/2000 Akagawa .............. G08B 13/19
340/541
2004/0183679 A1 * 9/2004 Paximadis ............ G08B 13/19
340/567

(Continued)

FOREIGN PATENT DOCUMENTS

JP          11355762 A  * 12/1999  ....... G08B 13/19602

*Primary Examiner* — Masum Billah
(74) *Attorney, Agent, or Firm* — Yutian Ling

(57) ABSTRACT

Techniques are disclosed for detecting stationary presence using IR sensor array. A number of IR images may be captured. Of the IR images captured by the IR sensor array certain pixels can be identified as causing false triggers. These pixels can be identified and filtered to be ignored. The non-filtered pixels of IR images may be averaged over various time intervals to calculate a number of average IR frames. The difference between these average IR frames provides a delta frame. A mask frame may be calculated as the summation of delta frames over time, and the value of the mask frame may be used to detect a stationary human presence even when no delta value is calculated. Alternatively, the mask frame may be used to calculate a background frame that represents the IR signature of stationary or cyclical objects within the scanned area that are not intended to trigger the presence detection system. A stationary presence may be determined by subtracting the background frame from a current average IR frame.

16 Claims, 7 Drawing Sheets

Related U.S. Application Data

(60) Provisional application No. 62/137,166, filed on Mar. 23, 2015.

(51) Int. Cl.
*H04N 5/33* (2006.01)
*G01V 8/10* (2006.01)
*G08B 13/194* (2006.01)
*G08B 13/196* (2006.01)

(52) U.S. Cl.
CPC ....... *H04N 5/332* (2013.01); *G08B 13/19602* (2013.01)

(58) Field of Classification Search
CPC ........... G06K 9/00087; G06K 9/00718; G06K 9/00771; G06K 9/00805
USPC .......................................... 700/275; 348/143
See application file for complete search history.

(56) References Cited

U.S. PATENT DOCUMENTS

| | | | |
|---|---|---|---|
| 2007/0162942 A1* | 7/2007 | Hamynen | G06F 17/3087 725/105 |
| 2009/0041297 A1* | 2/2009 | Zhang | G06K 9/00362 382/103 |
| 2011/0128374 A1* | 6/2011 | Shellshear | H04N 7/18 348/135 |
| 2012/0072032 A1* | 3/2012 | Powell | F24F 11/0034 700/278 |
| 2013/0128051 A1* | 5/2013 | Velipasalar | H04N 7/18 348/158 |
| 2013/0321637 A1* | 12/2013 | Frank | H04N 5/33 348/152 |
| 2014/0040173 A1* | 2/2014 | Sagher | G06N 20/00 706/12 |
| 2015/0077566 A1* | 3/2015 | Xiao | H04N 17/002 348/152 |

* cited by examiner

Fig. 4

| ⧗2⧗ | 0 | 0 |
|---|---|---|
| ⧗2⧗ | 1 | 0 |

IR Frame
t = 0 sec.

| ⧗F⧗ | 0 | 0 |
|---|---|---|
| ⧗F⧗ | 0 | 0 |

Delta Frame
t = 0 sec.

| ⧗F⧗ | 0 | 0 |
|---|---|---|
| ⧗F⧗ | 0 | 0 |

Mask Frame
t = 0 sec.

| ⧗0⧗ | 0 | 2 |
|---|---|---|
| ⧗0⧗ | 1 | 2 |

IR Frame
t = 10 sec.

| ⧗F⧗ | 0 | 2 |
|---|---|---|
| ⧗F⧗ | 0 | 2 |

Delta Frame
t = 10 sec.

| ⧗F⧗ | 0 | 2 |
|---|---|---|
| ⧗F⧗ | 0 | 2 |

Mask Frame
t = 10 sec.

| ⧗2⧗ | 2 | 0 |
|---|---|---|
| ⧗2⧗ | 1 | 2 |

IR Frame
t = 1 min.

| ⧗F⧗ | 2 | -2 |
|---|---|---|
| ⧗F⧗ | 0 | 0 |

Delta Frame
t = 1 min.

| ⧗F⧗ | 2 | 0 |
|---|---|---|
| ⧗F⧗ | 0 | 2 |

Mask Frame
t = 1 min.

| ⧗2⧗ | 2 | 0 |
|---|---|---|
| ⧗2⧗ | 1 | 2 |

IR Frame
t = 1 hr.

| ⧗F⧗ | 0 | 0 |
|---|---|---|
| ⧗F⧗ | 0 | 0 |

Delta Frame
t = 1 hr.

| ⧗F⧗ | 2 | 0 |
|---|---|---|
| ⧗F⧗ | 0 | 2 |

Mask Frame
t = 1 hr.

Fig. 5

| | | | | | | | | |
|---|---|---|---|---|---|---|---|---|
| F | 0 | 0 | F | 0 | 0 | F | 0 | 0 |
| F | 1 | 0 | F | 0 | 0 | F | 0 | 0 |

IR Frame t = 0 sec.   Delta Frame t = 0 sec.   Mask Frame t = 0 sec.

| | | | | | | | | |
|---|---|---|---|---|---|---|---|---|
| 0 | 0 | 2 | F | 0 | 2 | F | 0 | 2 |
| 0 | 1 | 1 | F | 0 | +1 | F | 0 | 1 |

IR Frame t = 10 sec.   Delta Frame t = 10 sec.   Mask Frame t = 10 sec.

| | | | | | | | | |
|---|---|---|---|---|---|---|---|---|
| 0 | 2 | 0 | F | 2 | -2 | F | 2 | 0 |
| 2 | 1 | 1 | F | 0 | 0 | F | 0 | 1 |

IR Frame t = 1 min.   Delta Frame t = 1 min.   Mask Frame t = 1 min.

| | | | | | | | | |
|---|---|---|---|---|---|---|---|---|
| 2 | 2 | 0 | F | 0 | 0 | F | 2 | 0 |
| 0 | 1 | 0 | F | 0 | -1 | F | 0 | 0 |

IR Frame t = 1 hr.   Delta Frame t = 1 hr.   Mask Frame t = 1 hr.

Fig. 6

| | | |
|---|---|---|
| 0 | 0 | 0 |
| 0 | 0 | 0 |

IR Frame
t = 0 sec.

| | | |   | | | |   | | | |   | | | |
|---|---|---|---|---|---|---|---|---|---|---|---|---|---|---|
| 0 | 1 | 0 |   | F | 1 | 0 |   | F | 1 | 0 |   | F | 0 | 0 |
| 2 | 0 | 0 |   | F | 0 | 0 |   | F | 0 | 0 |   | F | 0 | 0 |

IR Frame           Delta Frame         Mask Frame          Digital Mask
t = 10 sec.        t = 10 sec.         t = 10 sec.         t = 10 sec.

| | | |   | | | |   | | | |   | | | |
|---|---|---|---|---|---|---|---|---|---|---|---|---|---|---|
| 2 | 1 | 2 |   | F | 0 | 2 |   | F | 1 | 2 |   | F | 0 | 1 |
| 0 | 0 | 0 |   | F | 0 | 0 |   | F | 0 | 0 |   | F | 0 | 0 |

IR Frame           Delta Frame         Mask Frame          Digital Mask
t = 1 min.         t = 1 min.          t = 1 min.          t = 1 min.

| | | |   | | | |   | | | |   | | | |
|---|---|---|---|---|---|---|---|---|---|---|---|---|---|---|
| 2 | 2 | 0 |   | F | 1 | -2 |  | F | 2 | 0 |   | F | 1 | 0 |
| 2 | 0 | 0 |   | F | 0 | 0 |   | F | 0 | 0 |   | F | 0 | 0 |

IR Frame           Delta Frame         Mask Frame          Digital Mask
t = 10 min.        t = 10 min.         t = 10 min.         t = 10 min.

| | | |   | | | |   | | | |   | | | |
|---|---|---|---|---|---|---|---|---|---|---|---|---|---|---|
| 1 | 1 | 0 |   | F | -1 | 0 |  | F | 1 | 0 |   | F | 0 | 0 |
| 0 | 0 | 0 |   | F | 0 | 0 |   | F | 0 | 0 |   | F | 0 | 0 |

IR Frame           Delta Frame         Mask Frame          Digital Mask
t = 1 hr.          t = 1 hr.           t = 1 hr.           t = 1 hr.

HUMAN PRESENCE DETECTION COMMISSIONING TECHNIQUES

CROSS-REFERENCE TO RELATED APPLICATIONS

This patent application is a continuation-in-part U.S. patent application Ser. No. 14/076,372, titled "Human Presence Detection Techniques" filed on Nov. 11, 2013 and claims the benefit of: U.S. Provisional Patent Application No. 62/137,166, titled "Presence Detection" filed on Mar. 23, 2015 and. Each of these patent applications is herein incorporated by reference in its entirety.

FIELD OF THE DISCLOSURE

This disclosure relates to presence detection techniques, and more specifically to intelligent lighting control systems capable of detecting human presence.

BACKGROUND

In special occupancy systems, acoustic motion sensors and IR sensors may be used to detect a human presence within a scanned space. Accurately detecting a human presence while avoiding false triggers involves a number of non-trivial challenges.

BRIEF DESCRIPTION OF THE DRAWINGS

FIG. 4 shows an IR frame, delta frame, and mask frame of a room at various time intervals, according to one embodiment of the present invention.

FIG. 5 shows an IR frame, delta frame, and mask frame of a room at various time intervals, according to another embodiment of the present invention.

FIG. 6 shows an IR frame, delta frame, mask frame, and digital mask frame of a room at various time intervals, according to one embodiment of the present invention.

DETAILED DESCRIPTION

Figure 1A:
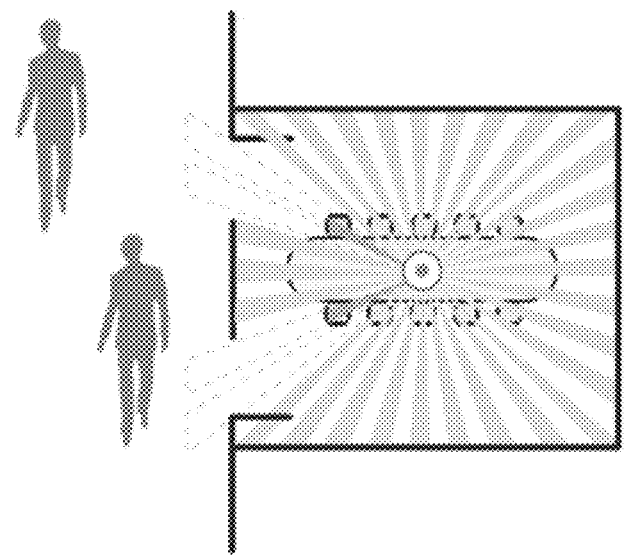
FIG. 1a is diagram of a room having humans pass by the room.

Techniques are disclosed for detecting stationary presence using IR sensor data and for commissioning such systems. A number of IR images of a given area being monitored may be captured using an IR sensor and these IR images may be averaged over various time intervals to calculate a number of average IR frames. The difference between these average IR frames provides a delta frame, and the value of the delta frame may be used to detect activity within the scanned area. In some embodiments, any delta value indicative of a significant change in heat signature may activate the presence detection system. In some cases, a local activity may be detected based on the location of the delta value within the delta frame, and the dimensions of the delta frame may be determined by the pixel count of the IR sensor. A mask frame may be calculated as the summation of delta frames over time, and the value of the mask frame may be used to detect a stationary human presence even when no delta value is calculated (e.g., because the person is sitting still). The dimensions of the mask frame may be determined by the pixel count of the IR sensor, and a local presence may be detected based on the location of the mask value within the mask frame. In some such embodiments, a digital mask frame may be calculated as a binary representation of the mask frame and a stationary human presence may be determined based on the value of the digital mask frame. The mask frame may also be used to calculate a background frame that represents the IR signature of stationary or cyclical objects within the scanned area that are not intended to trigger the presence detection system. A stationary presence may be determined by subtracting the background frame from a current average IR frame.

In some cases, pixels of a frame may detect activity outside the confines of the room or other potential false triggers. When these sensors are commissioned, installers are required to position each sensor such that the sensor has the "best view" of the entire coverage area. In other words, the sensor should be able to see areas that are relevant from an occupancy detection point of view (for e.g. areas where people sit and move around in the given space) but discard sources of potential false triggers, for example but not limited to, a hallway traffic visible thru the door, fireplace in the room or a heating vent. For instance, an IR sensor that can see thru an open door into a hallway would false trigger when a passerby walks across the door. Embodiments of the invention can provide a system and method to reduce these false triggers and/or circumnavigate the tedious and manual commissioning process of occupancy sensors for covering undesired areas and exposing areas that are relevant from an occupancy point of view.

During the commissioning process these pixels of the IR frame that are prone to producing false triggers can be identified and removed from the presence detection calculations and process. One or more pixels of the IR frame associated with IR sensor array can be identified as filtered in a commissioning process. The above described techniques for detecting stationary presence can ignore or weight the filtered pixels. more General Overview As previously explained, spacial occupancy may be determined using passive infrared (PIR) sensors or ultrasonic sensors; however, these systems often rely on a fixed timeout counter and may be prone to false triggering. Each time motion is detected in the environment, the occupancy detection system turns the output on for a fixed period of time, for example five minutes, regardless of the actual duration of occupancy. This may lead to wasting energy as the output may stay on for much longer than necessary (e.g., even though the person has left the room, the lights remain on for the remainder of the fixed time period). Also, if a person remains relatively still, the lights may go off after the time limit has run, leaving the person in the dark, until they perform some movement to re-trigger the lighting system. Furthermore, false triggering may occur from events such as flowing hot air (e.g., from a heating system) or cycling hot objects in the environment such as a machine or pet. In some cases, varying sunlight or shadows through windows, curtains, sunlit carpet or reflective surface, fireplace, etc. may all contribute to false triggering of IR sensors.

Thus, in accordance with an embodiment of the present invention, human occupancy detection techniques are disclosed utilizing infrared grid arrays and infrared image processing. The proposed system not only enables detection of stationary human presence, but also enables background estimation and masking out objects in the special environment. Stationary human presence detection removes the need for occupants to periodically move or wave a hand in order to keep the system from turning off. In some embodiments, stationary human presence may include a person temporarily outside the field of view of an IR sensor, such as behind a cubicle wall. Furthermore, allowing the output to be turned off as soon as the space is vacant, as opposed to waiting until a fixed output period concludes, provides increased energy efficiency. Such techniques may be integrated, for example, with numerous systems, such as lighting, surveillance, HVAC, safety/alarm systems, etc. In one embodiment, an IR sensor or camera may be mounted on a ceiling to create IR images or frames of a room. In one such example, the IR sensor includes an IR grid array and interfaces with a microcontroller or other suitable computing system. In other embodiments, multiple IR sensors may work in unison to scan an area, and there may be some overlap between sensors. In such an embodiment, multiple IR sensors at different angles within a room may allow for greater IR visibility such a person is rarely out of the field of view of all the IR sensors. The sensor may send a fixed number of frames per second to the microcontroller (e.g., 4, 8, or 16 frames per second) for IR image processing, in some embodiments. Image processing may alternatively be performed on a separate computer or processor that communicates with the microcontroller, in other embodiments. The IR band selection in one embodiment is based on a number of factors including indoor/outdoor sensing, operating distance, temperature of object of interest, and the emissivity of the object of interest. In one specific example for indoor occupancy sensing, the far infrared wavelength range between 8-14 um is used. Examples of suitable sensors include the Omron D6T-44L-06 (4×4), Panasonic "Grid-EYE" AMG8831 (8×8), or the Melexis MLX90620 (4×16) sensor.

In one example embodiment, a rolling average of the IR images is calculated over different time periods and any activity in space may be determined by calculating the delta between average images. Averaging may be performed over various time increments and at various intervals, as will be appreciated. For example, a 1 second average (e.g., averaging 16 frames if the IR sensor captures 16 frames per second) or a 10 second average (averaging 160 frames) may be performed every minute. In one specific example embodiment, a 5-second average may be calculated at time t=5 sec. and again at time t=10 sec., and these two 5-second averages may be subtracted to find a delta value. As will be appreciated, averaging images and comparing averaged images to calculate a delta value may be performed at different time intervals and the averages may have different time lengths, in some embodiments. Averaging multiple frames may also provide noise filtering, in some embodiments. A large number of IR frames per second provides increased data as well as an increased amount of noise, and this noise may be reduced by taking multiple averages with a noise filtering buffer. A given room may have a specific IR image while vacant and any additional heat source will be detected by the IR sensor creating a finite delta value that implies activity. For example, if a room is vacant for three minutes before a person enters, the average IR image over 10 seconds, 30 seconds, 1 minute, and 2 minutes will be substantially equal (within a given tolerance) and the delta value will be zero. After 3 minutes, however, a human enters the room and the human's body temperature creates a new IR image causing the delta value to be a positive real number because of the added human's heat signature.

In one embodiment, the detection of a significantly large delta value indicates activity and may trigger the lights to turn on, while the mask is calculated over time in order to detect a stationary human presence and maintain the lights on. The threshold value for delta activity may depend on the specific application, and may be based on the heat signature of a human, as opposed to the heat signature of a pet, heater, laptop fan, etc. In one embodiment, the delta values (changes in IR scene) are integrated over time to compute a mask frame, such that background activity (such as cycling warm objects) get nullified by the delta summation and do not show up in the mask. However, relatively fast moving humans present a non-zero value of delta and these areas clearly show up in the mask, essentially distinguishing between the foreground and the background. In one specific example, a person enters a room and remains there for an hour without significant movement. In such an example, the delta value will be zero after the initial entry but the mask will remain a positive number reflecting the stationary human presence. Until the person leaves the room, the mask will remain a positive number and the lights may stay on; but once the person leaves the room a negative delta is calculated, the negative delta is added to the mask, and the lights may be shut off in a relatively timely fashion. The mask may protect a stationary human occupant in the scene against the background or any cyclical heat sources, and in some embodiments further mathematical processing may be performed on the IR images for background estimation and presence detection. In other embodiments, the delta summation may be divided by the individual IR pixels, or clusters of pixels, in order to detect a local presence.

In alternative embodiments, visible light sensors and/or cameras may be used instead of or in combination with IR sensors, or a passive IR sensor may turn the output on while an IR grid array may be used to turn the output off. However, such solutions may require visible light to be present, consume additional computational or processing power, have higher power consumption, or pose privacy issues. As will be appreciated, the techniques disclosed provide a digital output that may be used to control lights, HVAC systems, window blinds, surveillance cameras, or any other systems that may benefit from human presence detection. For ease of description, however, examples are provided for controlling lighting systems.

Human Presence Detection Examples

FIG. 1a shows scenarios (depending on the mounting location of the sensor) in which filtering may or may not be needed. The IR sensor can clearly see people walking thru the hallway. The IR sensor array images the room from a central location to best identify the presence of humans throughout the room. However, pixels captured by the IR sensor array may also capture humans as they walk thru the adjacent hallway. This may lead to false triggers of the system capturing human presence not associated with use of the room. Embodiments provide for electronically filtering of one or more pixels of the IR sensor array that are capturing the human presences in the adjacent hallway and producing the false triggers. The commissioning process can reduce the physical climbing needed to reposition the IR sensor grid or the need to physically mask the IR sensor grid. Embodiments of the invention therefore can provide for faster commission of the system. This can also provide reduced labor cost associated with installation and maintenance of the system. Fine tuning and minor adjustments can be done in a simpler manner. In addition, further adjustments can be made with automated processes that allow for data collection over a period of actual use. For example, the system can be alerted of false triggers and identify pixels associated with the false triggers. The system can be recalibrated to identify those pixels as filtered without the need of installer involvement. This can also provide more accurate commissioning with respect to areas to be covered and not covered by the sensor.

Figure 1B:
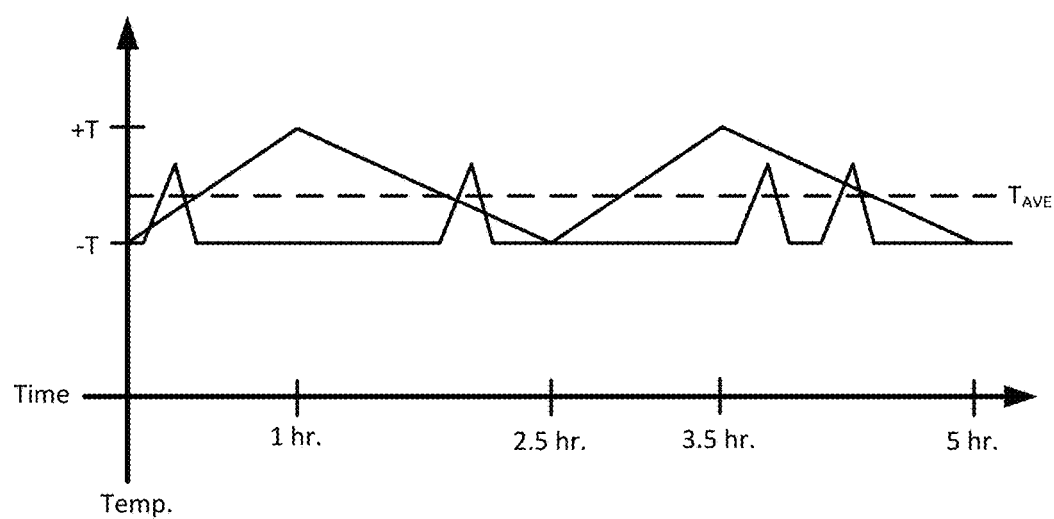
FIG. 1b is a graph of the temperature over time of a room having a cyclical heat source, such as an HVAC system and humans pass by the room.

FIG. 1b is a graph of the temperature of a room over time for a cyclical heat source, such as an HVAC system and detection of humans in an adjacent hallway. In such an example, when the room temperature reaches a lower threshold −T the heater turns on and increases the room temperature steadily up to an upper threshold value +T, at which point the heater turns off and the room slowly cools down to the lower threshold and the cycle repeats. In this particular example, the heater turns on at time t=0 and at the 2.5 hour mark, and turns off at the 1 hour 3.5 hour marks when temperature +T is reached. While the temperature varies between +T and −T, the average temperature over time is a constant $T_{AVE}$ and the net temperature change from time t=0 to t=5 hrs. is zero. The system is also detecting a human presence in the hallway four time in the same timeframe.

Figure 2:
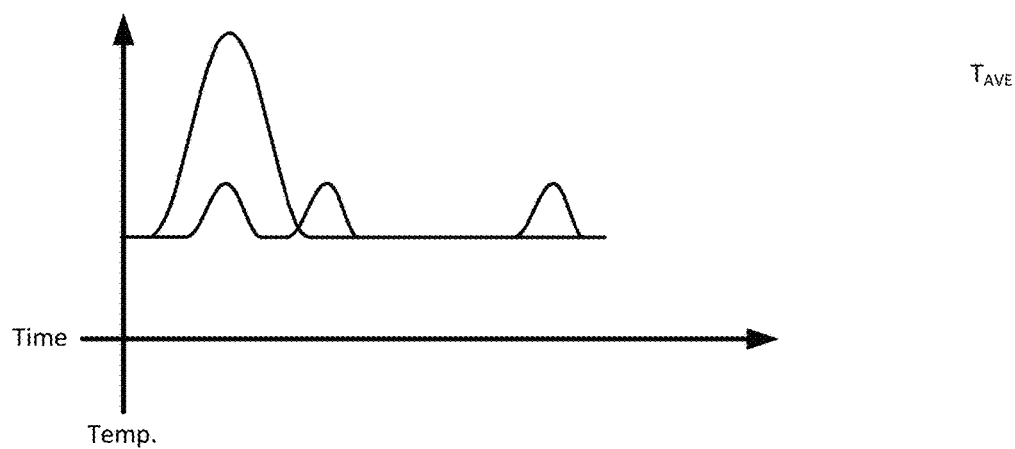
FIG. 2 is a graph of the temperature over time of a room having a human entering and leaving the room and humans pass by an opening of the room.

FIG. 2 is a graph of the temperature of a room over time for a human passing by an opening to adjacent space of the room and a human entering and leaving the room. The human briefly enters the room, in this example, causing a larger spike in the local temperature. The humans passing by the room produce three smaller spikes in temperature sensed by the IR sensor array. The thermal mass of a heat source may be computed based on the slope of change in temperature over time, as well as the magnitude of the heat change. As can be seen, the local temperature in this example increases more dramatically and has a steeper slope as compared to the cyclical heat source of FIG. 1 because the human body has a larger local heat signature.

In one embodiment, IR sensor data is acquired as individual frames which may be expressed as F(w,h) wherein w=frame width and y=frame height. The width of such frames may be determined by the digital resolution or pixel count in the IR sensor, in some embodiments. The acquired frames may be averaged over time for the purpose of noise filtering, as well as to calculate the multiple frame averages used to determine the delta value, in some embodiments. For ease of description, examples are provided below with a 2×2 pixel array; however, other IR image resolutions are possible and will be apparent in light of this disclosure. In some embodiments, equation (1) may be used to calculate the frame averages, where $F_i$ represents the IR frame value at the $i^{th}$ second, and $F_{\varphi,t}$ represents the average IR frame over t seconds.

$$F_{\varphi,t} = 1/t * \sum_{i=0}^{t} F_i(w, h) \quad (1)$$

The delta frame, $F_{\Delta(m,n)}$, may be calculated by subtracting two frames averaged over different periods of time. For a static heat source, such as a person sitting at a desk for an extended period of time, the delta frame will be positive when the person enters the room but remain zero until the person leaves. A cycling heat source may be periodically detected and the delta value will change accordingly, however, as illustrated in FIG. 1, an average of the delta value over time will be zero. In one embodiment, the delta frame may be represented by equation (2), where $F_{ave,m}$ is the average frame after time m, and $F_{ave,n}$ is the average frame after time n.

$$F_{\Delta(m,n)} = F_{ave,m} - F_{ave,n} \quad (2)$$

However, even with these calculations, the slopes of the humans passing by the room may still present false triggers. According to another embodiment of the invention, the pixels associated with detection of the humans passing by the room can be electronically filtered and removed from the above presence calculation and algorithm. Thereby reducing or eliminating both false triggers caused by HVAC and humans passing by the room.

Figure 3:
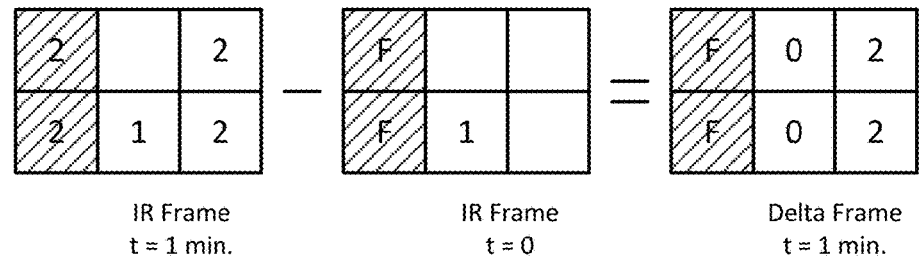
FIG. 3 illustrates the calculation of a delta frame after one minute, according to an embodiment of the present invention.

FIG. 3 illustrates the calculation of a delta frame after one minute, according to an embodiment of the present invention. As mentioned above, the IR sensor includes six pixels and the room being scanned is divided into six sections, in this particular example. At time t=0, one corner of the room has a small heat source, such as a lamp, with a heat signature of 1. After one minute, two people having a larger heat signature of 2 have entered the right side of the room and the two pixels on the right of the IR frame have the value 2. On the other side of the room, two people having a larger heat signature of 2 have are just outside of on the left side of the room and the two pixels on the left of the IR frame have the value 2.

These heat signature values and pixels are provided for illustrative purposes only and are not meant to reflect specific temperature values. Subtracting the average IR frame at one minute from the frame at time zero, produces the delta frame at time t=1 minute. A sufficiently large value in a delta frame may indicate human activity in the room and cause the lights to be turned on, in some embodiments. In one specific example, a light turning on, a laptop fan activating, or cat entering a room does not create a large enough value in the delta frame to trigger the lighting system, while the heat signature of a human triggers the system and turns the lights on. The IR sensor may detect activity in isolated areas of a scanned space, and may also calculate a total activity magnitude value. Calculating a local activity may include, for example, scanning certain areas of space with different pixels and calculating a local delta for each pixel or cluster of pixels. The total activity magnitude may be calculated, for example, by adding all the pixels in the delta frame at a given point in time. In one embodiment, the total activity magnitude $V_{F\Delta}$ may be represented by equation (3), where $P_{\Delta(x,y)}$ represents the value of pixel P at position (x,y) on the pixilated array, and $V_{F\Delta}$ represents the sum of all pixels in the delta frame.

$$V_{F\Delta} = \sum_{0}^{x-1} \sum_{0}^{y-1} P_\Delta(x, y) \quad (3)$$

Once activity within the room has been detected with the delta frame, a continued presence within the room may be determined by calculating a mask frame, in some embodiments. Such a mask frame may be calculated by integrating the delta frames over time. The mask frame may detect a stationary human presence by remaining a positive value even if no additional delta value is detected. Calculating a local presence may include, for example, scanning certain areas of space with different pixels and calculating a local mask frame value for each pixel or cluster of pixels. In such an embodiment, the pixels in an IR sensor array may be segmented into arrays or clusters, each cluster corresponding to, for example, a row of cubicles or a section of a conference room. In some embodiments, an estimation of the number and location of people within a scanned location may be calculated, depending on the sensitivity and resolution of the IR sensor being used to capture IR frames. Furthermore, the location of a single person may be continuously tracked using the techniques described, in some embodiments. In one particular embodiment, a high resolution IR sensor may determine a human presence based on the number and shape of coherent pixels within the mask frame or the motion and speed of the pixels of the mask frame. Furthermore, a human entering or leaving the field of view of an IR sensor (e.g., behind a cubicle wall) may be detected and the system may be configured to account for such activity in the mask frame.

The mask frame $F_{mask}$ may be represented, in some embodiments, by equation (4), where $F_{\Delta i}$ represents the delta frame at the $i^{th}$ second, and $\beta$ represents a diminishing factor used to clear the mask over time. While cyclical heat sources will negate themselves in the mask over time, it might be necessary to recalibrate or clear the mask frame in order to account for, for example, an added static heat source. In one example, an added static heat source could be a space heater, lamp, or desktop computer that is added to a room for a long period of time and is not a cyclical heat source. The diminishing factor accounts for these situations by clearing the mask at certain intervals. Under normal circumstances, a stationary human presence will not last more than a few hours in the same place at any one time, so the diminishing factor may be chosen such that stationary heat sources are cleared from the mask frame after a few hours. In one embodiment, $\beta$ is a fixed number derived from the time which the mask must get cleared. Thus, in one embodiment, accumulating the delta values distinguishes human presence from cyclical heat sources while the diminishing factor distinguishes human presence from the background.

$$F_{Mask} = \left| \sum_{i=0}^{t} F_{\Delta i} \right| * \beta \quad (4)$$

However, even with utilization of the above algorithm, the presence of the human individual on the left side of the room in an adjacent room would still falsely trigger the system to identify presence within the room. An additional embodiment can alert the system that these are false positive. The algorithm can then filter the two left pixels and ignore them completely or ignore any value calculated by the pixels. Embodiments are not limited to completely ignore a pixel. Some embodiments may sampling weight those pixels in more rigorous manner. In other embodiments, the specified filtered pixels may be set to filter during specific period of time. The pixels may not be filtered during business hours but may be filtered during off-peak hours. This can trigger the lights to remain on during heavy traffic and use of the building but turn lights off during low use of the building. For purposes of illustration the filtered pixels are identified by a diagonal stripped pattern and non-filtered pixels used in the calculation are identified by a standard white background in FIGS. 3-6.

FIG. 4 shows the IR frame, delta frame, and mask frame of a room at various time intervals, according to one embodiment of the present invention. In this particular example, the IR sensor includes six pixels and the room being scanned is divided into six sections. The two left most section are filtered and the remaining four section or quadrants are non-filtered. At time t=0 one corner of the room has a small heat source, such as a lamp or desktop computer, with a heat signature of 1. This heat source is reflected by the value of 1 in the third quadrant in the first IR frame at time t=0. The delta frame and the mask frame at t=0 are all zero in this embodiment. At time t=10 seconds, two people having a larger heat signature of 2 have entered the right side of the room and the first and fourth quadrants of the IR frame now have the value 2. The first and fourth quadrants of both the delta frame and the mask frame at time t=10 seconds have a value of 2, reflecting the additional human presence. In one embodiment, the lighting system is configured to activate upon detecting an object with a heat signature of 2 or greater entering the room, so at t=10 seconds the lights in the room will turn on. At time t=1 minute, in this example embodiment, the person in the upper right corner of the room moves to another spot in the room, resulting in the second quadrant of the IR frame now having a value of 2 and the first quadrant having a value of zero. The delta frame, in this example, now has a value of 2 in the second quadrant and −2 in the first quadrant at time t=1 minute. Because the mask frame is a summation of the delta frames, the mask frame now has a value of 2 in the second quadrant and zero in the first quadrant. After one hour, no additional activity has occurred in the room, in this example, and therefore the IR frame at time t=1 hour is the same as at t=1 minute. The delta frame at time t=1 hour is zero because no change has been detected, however, the mask frame at time t=1 hour in this particular example still has a value of 2 in the second and fourth quadrants reflecting the stationary people in those parts of the room. While a standard motion sensing lighting system might turn off after not detecting motion for an hour, the lights remain on in this example embodiment because the mask frame monitors the stationary presence.

FIG. 5 shows the IR frame, delta frame, and mask frame of a room at various time intervals, according to another embodiment of the present invention. In this particular example, the IR sensor includes six pixels and the room being scanned is divided into six sections. The two left most section are filtered and the remaining four sections or quadrants are non-filtered. At time t=0 one corner of the room has a small heat source, such as a lamp or desktop computer, with a heat signature of 1. This heat source is reflected by the value of 1 in the third quadrant in the first IR frame at time t=0. The delta frame and the mask frame at t=0 are all zero in this embodiment. At time t=10 seconds, one person having a larger heat signature of 2 enters the right side of the room and the first quadrant of the IR frame now has the value 2. Furthermore, a heating vent turns on and a heat signature of 1 is detected in the fourth quadrant of the IR frame at time t=10 seconds. The first quadrant of the delta frame and the mask frame have a value of 2, while the fourth quadrant of the delta frame and the mask frame have a value of 1 at time t=10 seconds. In one embodiment, the lighting system is configured to activate upon detecting an object with a heat signature of 2 or greater entering the room, so at t=10 seconds the lights in the room will turn on. At time t=1 minute, in this example embodiment, the person in the upper right corner of the room moves to another spot in the room, resulting in the second quadrant of the IR frame now having a value of 2 and the first quadrant having a value of zero. The delta frame, in this example, now has a value of 2 in the second quadrant and −2 in the first quadrant at time t=1 minute. Because the mask frame is a summation of the delta frames, the mask frame now has a value of 2 in the second quadrant and zero in the first quadrant. In this example, after one hour no additional human activity has occurred in the room. However, the local heating source detected in the fourth quadrant of the IR frame has turned off causing the fourth quadrant of the delta frame to have a value of −1 at time t=1 hour. The cyclical heat source is then subtracted from the mask frame at time t=1 hour and the fourth quadrant of the mask frame has a value of zero. In this example embodiment, even though a decrease in heat is detected when the heating source in the fourth quadrant turns off, the lights will still remain on at time t=1 hour because the human presence in the second quadrant is still detected by the mask frame.

A mask magnitude may be calculated, in some embodiments, as the sum of all pixels in the mask frame $F_{Mask}$ at a given point in time. The mask magnitude $V_{FMask}$ may be represented, for example, by equation (5), where $P_{Mask}(x,y)$ represents the value of pixel P at position (x,y) on the pixilated array.

$$V_{FMask} = \sum_{0}^{x-1}\sum_{0}^{y-1} P_{Mask}(x, y) \quad (5)$$

In some embodiments, a digital mask frame may be calculated that represents the mask frame in a binary format. In one example, the digital mask may be used to easily identify human presence within the scanned space by filtering out any IR delta values in the mask that are below those typically created by a human presence. Specifically, if a human presence has a heat signature value of 2, for example, and a cat enters a room with a heat signature of 1, the mask frame may include a value of 1 in one section. However, since a heat signature of 1 is below the threshold for human presence, the digital mask may disregard that value, in some embodiments. In other embodiments the threshold may be calculated as the average pixel value, or any other value suitable for filtering out unwanted values in the mask frame. In one specific example, the digital mask frame $F_{DMask}$ may be represented by equations (6) and (7), where $P_{Mask}(x,y)$ represents the pixel value in the mask frame at position (x,y), $P_{DMask}(x,y)$ represents the pixel value at position (x,y) of the digital mask frame, Threshold represents the average pixel value in the mask frame, and $F_{DMask}$ represents the binary digital mask.

$$F_{DMask} = \begin{Bmatrix} P_{Mask}(x, y) > \text{Threshold}; P_{DMask}(x, y) = 1 \\ P_{Mask}(x, y) < \text{Threshold}; P_{DMask}(x, y) = 0 \end{Bmatrix} \quad (6)$$

$$\text{Threshold} = \frac{\sum_{0}^{x-1}\sum_{0}^{y-1} F_{Mask}(x, y)}{\# \text{ pixels}} \quad (7)$$

FIG. 6 shows the IR frame, delta frame, mask frame, and digital mask frame of a room at various time intervals, according to one embodiment of the present invention. In this particular example, the IR sensor includes six pixels and the room being scanned is divided into six sections. The two left most section are filtered and the remaining four section or quadrants are non-filtered. For ease of description, the digital mask frame in this particular example is calculated with a pixel threshold value of 1, such that any mask frame pixels with a heat signature value greater than 1 will have a non-zero value in the digital mask frame. At time t=0 no heat sources are detected in the scanned room, so the IR frame is zero and the delta frame, mask frame, and digital mask frame will also be zero. In one example, at time t=10 seconds, a heater turns on in one corner of the room, causing the second quadrant of the IR frame to have a value of 1 at time t=10 seconds. The delta frame and the mask frame at time t=10 seconds both have a value of 1 in the second quadrant, in this example, representing the heating source in the corner of the room. The digital mask frame, however, still remains at zero because the heat signature of 1 from the heater is not greater than the threshold value for human presence. Because there are no non-zero values in the digital mask frame, the lights will remain off at time t=10 seconds, in this example. At time t=1 minute a person enters the upper right corner of the room, in this example, resulting in the first quadrant of the IR frame, delta frame, and mask frame now having a value of 2. However, the digital mask now detects a heat signature of 2 in the mask frame, which is above the threshold value for human presence. Therefore, at time t=1 minute the digital mask has a value of 1 in the first quadrant, in this example, and the lights will turn on.

At time t=10 minutes, in this example, the person in the upper right corner moves in front of the heater in the upper left of the room, blocking the heat signature of the heater and resulting in the second quadrant of the IR frame now having a value of 2 and the first quadrant having a value of zero. The delta frame, in this example, now has a value of 1 in the second quadrant and −2 in the first quadrant at time t=10 minutes. Because the mask frame is a summation of the previous delta frames, the mask frame at time t=10 minutes has a value of 2 in the second quadrant and zero in the first quadrant. The digital mask frame, in this example, still detects a heat signature of 2 in the mask frame, which is above the threshold value for human presence. Therefore, at time t=10 minutes, the digital mask frame has a value of 1 in the second quadrant, in this example, and the lights remain on. After one hour, the person leaves the room in this example, causing the IR frame at time t=1 hour to have only a value of 1 in the second quadrant. The delta frame at time t=1 hour has a value of −1 in the second quadrant, in this example, representing the person having left the room and the heater remaining on. In this embodiment, the mask frame has a value of 1 in the second quadrant, which is not above the threshold heat signature for human presence, so the digital mask frame will have a value of zero in all sections and the lights will turn off at time t=1 hour. In some embodiments, depending on the value of the diminishing factor β, if the heater remains on in the upper left section of the room it may be cleared from the mask frame such that it will no longer contribute to the value of the mask frame.

In some embodiments, an inverse digital mask, $F_{InvDMask}$, may be calculated, which is a bitwise complement of the digital mask and may be used for background estimation. The background frame, $F_{Back(n+1)}$, at time "n+1" may be represented by equation (8), where $F_{Back(n)}$ represents the previously calculated background frame, $F_{Coeff}$ represents the frame of background weight coefficients, and $F_{\varphi(n,t)}$ represents an average frame calculated from the frame buffer, where the average is of frames received over t seconds, n seconds ago. In some embodiments, the background frame begins at zero and slowly increases over time as the average frame increases. The inverse digital mask frame, $F_{InvDMask}$ is the inverse compliment of the mask frame, such that the inverse digital mask will only have a positive value where the mask frame has a zero value, thus restricting the background frame to frame sections not included in the mask. Such a background frame may represent the IR signature of stationary or cyclical hot objects within the scanned area. In some embodiments, the coefficient frame is represented by equation (9), where $P_{Mask}(x,y)$ is the value of pixel P in the mask frame at location (x,y).

$$F_{Back(n+1)} = F_{Back(n)} + \left[\frac{F_{\phi(n,t)} - F_{Back(n)}}{F_{Coeff}}\right] * F_{InvDMask} \quad (8)$$

$$F_{Coeff} = \begin{cases} P_{Mask}(x, y) > MaskThreshold; F_{Coeff} = 1 \\ P_{Mask}(x, y) < MaskThreshold; F_{Coeff} = 1 + P_{Mask}^2 \end{cases} \quad (9)$$

In some embodiments, a stationary human presence may be detected using the background frame, wherein the background frame is subtracted from a current average of IR frames. Background estimation requires more IR image processing as compared to detecting stationary human presence from the mask frame; however, increased accuracy may be achieved in some embodiments by subtracting the background frame from a current average of IR frames. Such a technique receives IR sensor data and removes any data relating to background objects and heat sources, effectively distinguishing between a stationary human presence and any background IR heat that may be present in a room. The presence frame represents the final presence calculation after subtracting the background frame from a short term average. In one embodiment, the presence frame Presence, may be represented by equation (10).

$$F_{Presence} = |F_{\phi(n\ sec)} - F_{Back(n)}| \quad (10)$$

In some embodiments, a local presence or general presence may be calculated. Calculating a local presence may include, for example, scanning certain areas of space with different pixels and calculating a local presence value for each pixel or cluster of pixels. In other embodiments, a total presence value may be calculated using equation (11), where $P_{Presence}(x,y)$ represents the value of pixel P at position (x,y) on the pixilated array, and $V_{Fpresence}$ represents the sum of all pixels in the presence frame.

$$V_{FPresence} = \sum_{0}^{x-1}\sum_{0}^{y-1} P_{Presence}(x, y) \quad (11)$$

Methodology

Figure 7A:
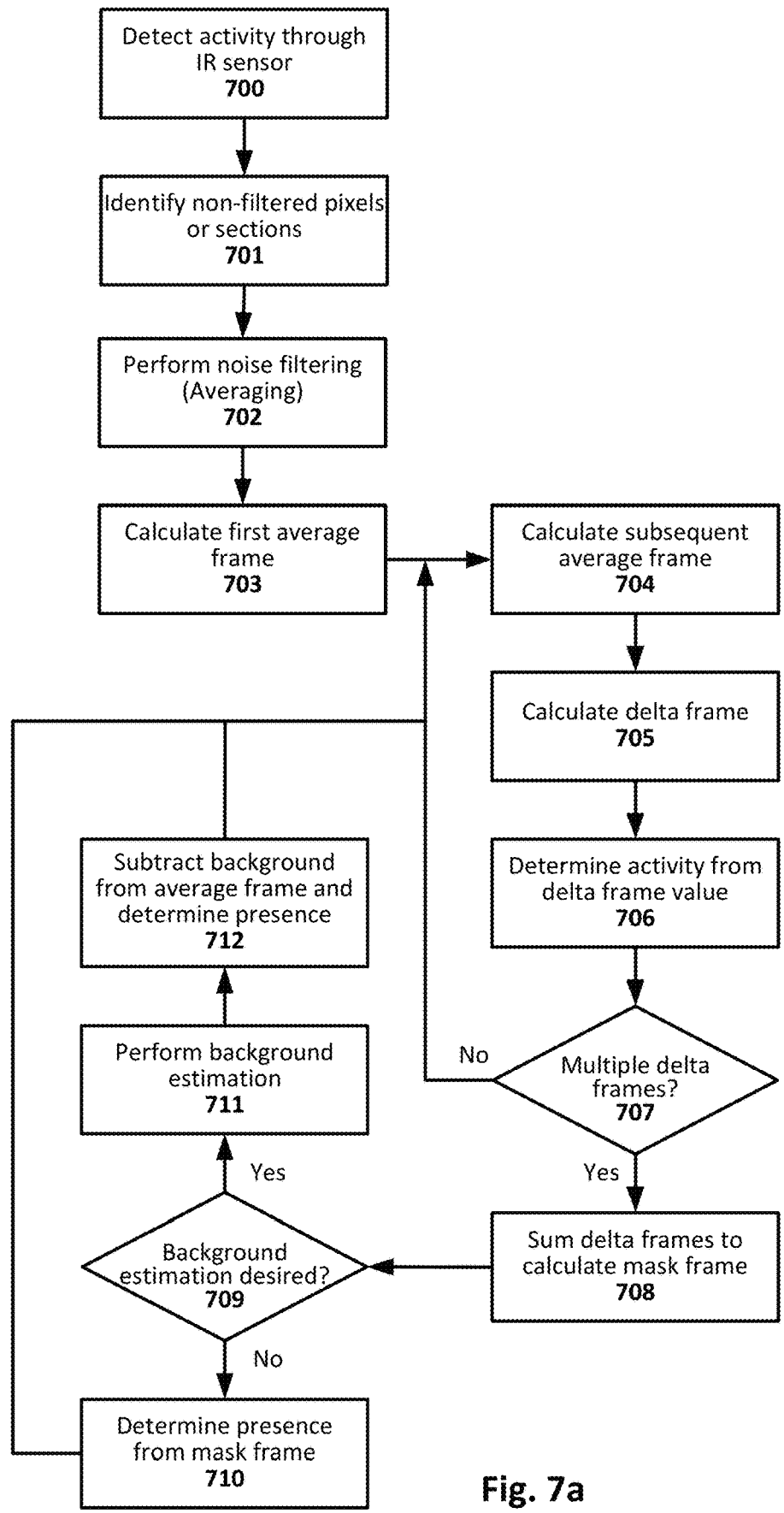
FIG. 7a illustrates a method for detecting stationary human presence and filtering pixels, according to an embodiment of the present invention.

FIG. 7a illustrates a method for detecting stationary human presence, according to an embodiment of the present invention. The method may begin with detecting 700 activity through an IR sensor. The method identifying 701 pixels that are filtered and non-filtered. The method then may only use pixels that are identified as non-filtered and use only non-filtered pixels in subsequent calculations. In other embodiments, the action of identifying non-filtered pixels 701 can be done at the end of the calculation to allow for analyzing of both filtered and non-filtered pixels but only acting on non-filtered pixel information. In some embodiments, the IR sensor includes an array of IR pixels capable of detecting hot objects entering and moving within the scanned space. The method may continue with performing 702 noise filtering, which includes averaging the IR frames detected by the IR sensor. The method may continue with calculating 703 a first average frame. The first average frame may include an average of IR frames over a first period of time, for example, one second. Other time periods are possible and the average frames described herein may be calculated over any number of time increments. The method may continue with calculating 704 a subsequent average frame. Once at least two average frames have been calculated, the method may continue with calculating 705 a delta frame. The delta frame may be calculated, for example, by subtracting the subsequent average frame from the first average frame. In some embodiments, several average frames may be calculated at various time increments, and a delta frame may be calculated by subtracting any average frame from the previous average frame. The method may continue with determining 706 human activity from the delta frame value. In some embodiments, the lighting system may be configured to activate upon detecting a delta value associated with the heat signature of a person entering a room (generally referred to herein as a heat signature difference). In such embodiments, any delta value less than that caused by a human presence, such as a pet or heating vent will not trigger the lighting system. The method may continue with determining 707 whether multiple delta frames have been calculated. If multiple delta frames have not been calculated, the method may continue with calculating 704 another subsequent average frame as well as calculating 705 another delta frame. If multiple delta frames have been calculated, the method may continue with summing 708 the delta frames to calculate a mask frame.

After the mask frame has been calculated, the method may continue with determining 709 whether background estimation is desired. If background estimation is not desired, the method may continue with determining 710 human presence based on the value of the mask frame. In some embodiments, determining human presence from the mask frame may include calculating a digital mask frame. If background estimation is desired, the method may continue with performing background estimation 711 by calculating a background frame. The method may continue with subtracting 712 the background frame from the current average frame in order to determine human presence. In some embodiments, performing background estimation and subtracting the background frame from the average frame may provide additional accuracy for human presence detection.

Figure 7B:
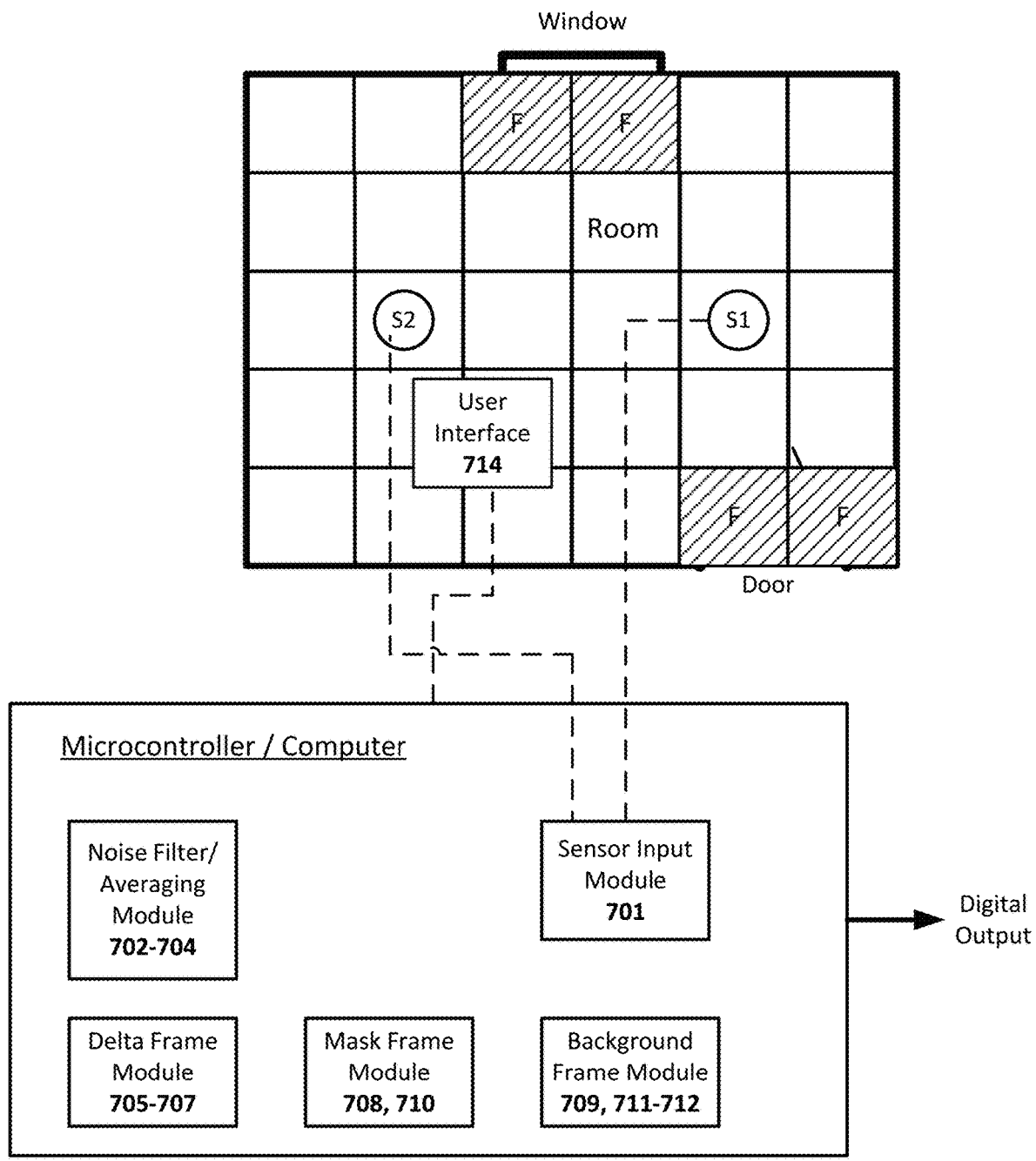
FIG. 7b illustrates an example system that can carry out the method of FIG. 7a, according to an embodiment of the present invention.

FIG. 7b illustrates an example system that can carry out the method of FIG. 7a, according to an embodiment of the present invention. As can be seen, the system includes a microcontroller or computer configured to detect human presence in a room using data collected from IR sensors. In this particular example embodiment, the microcontroller or computer is programmed or otherwise configured with a number of modules, including a sensor input module, noise filtering/averaging module, delta frame module, mask frame module, and background frame module. As will be appreciated, the functional modules may vary from one embodiment to the next, as may the degree of integration. For instance, in some embodiments, the delta frame, mask frame, and background frame modules may be implemented in a single module that provides the same overall functionality. To this end, note that the example structure shown is provided for purposes of discussion and is not intended to limit the claimed invention to any particular structure.

The sensor input module is connected to a number of IR sensor array S1-2, located within a room having a single entrance door and window, in this particular example. A 3×5 grid pattern is illustrated for each of the IR sensor array creating a 6×5 grid over the entire room. Each cell in the grid is illustrative of a pixel in the IR sensor array is provided for purposes of discussion and is not intended to limit the claimed invention. The microcontroller or computer may be any suitable microcontroller (e.g., an Arduino microcontroller or other suitable processing environment or computing system), and may include one or more co-processors or controllers. The functional modules can be implemented, for example, in any suitable programming language (e.g., C, C++, objective C, JavaScript, custom or proprietary instruction sets, etc.), and encoded on a non-transient machine readable medium, that when executed by the microcontroller (and/or co-processors), carries out the human presence detection techniques as variously described herein. In the example provided herein, human presence detection may be achieved using various modules within a single microcontroller/computer, however, as discussed above image processing and human presence detection may alternatively be performed on two or more separate computers, microcontrollers, or processors that communicate with each other and the IR sensors, in other embodiments. When describing the various example modules shown, reference will be made to corresponding functions previously discussed with reference to FIG. 7a.

With further reference to the example embodiment shown in FIG. 7b, the sensor input module is programmed or otherwise configured to receive input from the IR sensors array S1-2, located at various positions within the room and detects 701 activity through the IR sensors array. In some cases it may be desirable to position an IR sensor array on the ceiling and at least two adjacent walls in order to effectively scan a room. The noise filtering/averaging module is configured to perform noise filtering 702, and calculate a number of average frames 703-704, in some embodiments. The delta frame module, in this example, is configured to calculate 705 a delta frame, determine 706 activity within the room based on the value of the delta frame, and determine 707 the number of delta frames calculated. The mask frame module is configured to sum 708 the delta frames to calculate a mask frame value, and determine 710 presence from a mask frame value, in some embodiments. In other embodiments, the mask frame module may also be programmed or otherwise configured to calculate a digital mask as an alternative technique for determining human presence. The background frame module may be configured to determine 709 whether background estimation is desired, perform 711 background estimation, and subtract 712 a background frame from an average frame to determine human presence, in some embodiments. In this particular example, the microcontroller/computer further produces a digital output based on the human presence determination, and this digital output may be used to control various systems including, for example lighting, surveillance, HVAC, safety, and/or alarm systems.

With further reference to the example embodiment shown in FIG. 7b, the system may include a user interface 714. The user interface 714 can be used by the installer during the commissioning process. The user interface 714 can be configured to communicate wirelessly with the microcontroller/computer. The user interface 714 can be, for example, a mobile computing device, for example but not limited to, a smart phone, tablet or laptop. The user interface can allow the user to input information that can be transited and stored by the microcontroller/computer of the presence detection system. The user interface 714 can be used just during the commissioning or maintenance process.

With a thermal array as an occupancy sensor, complete spatial information in the thermal domain are available within the IR sensor's S1-S2 field of view. In this embodiment, the system can utilize the capability of transmitting thermal frames from the thermal grid array sensor directly to the user interface 714. The user interface 714 may present the commissioning personnel with a pixilated grid detected by the IR sensors array S1-2. This can allow the installer in real-time to view the IR signatures of the room. The field of view/coverage area for each IR sensor S1-S2 is made visible to this individual on the user interface 714. The pairing of sensor to the mobile device can be accomplished in multiple ways for e.g. Bluetooth pairing between an IR sensor and the commissioning device. It can also be done with a simple LED blinking on an un-commissioned IR sensor. As each sensor covers a room equivalent space and in case of pixelated IR sensor it may not make sense to have multiple of those close by, the identification process becomes easier. Another option is to have each IR sensor have its own IP address. These IP addresses are indicated on the building map/layout. The commissioning personnel knows which IP node to ping as they go to a specific part of the building.

Once the commissioning person has established a connection with a specific IR sensor S1-S2 and has access to the thermal frame data, it can be verified in multiple ways what is visible to the sensor from its mounting position. The commissioning personnel can either use a reference heat object to move in the sensor's field of view or using a single ceiling mount camera with fish eye view for all potential thermal sensors in the ceiling. The user interface 714 can show the thermal image overlaid with the visible image. In this manner, it becomes clearer as to which pixels belong to the real scene and which ones point at the non-relevant portions of the scene that can be discarded from an activity and presence point of view. Here are the examples of a visible imaging sensor aligned with a thermal sensor and their images overlaid. The commissioning personnel can map which thermal pixel belongs to which visible area. Once the pixels have been identified, the non-relevant pixels can be filtered and therefore prevented from being considered in activity and presence calculations.

This whole process eases commissioning significantly as the commissioning personnel can commission IR sensors without the need of a ladder to access the occupancy sensors nor a manual adjustment of masking shutters for each device.

In other embodiments, the user interface 714 can be a wall plate or touch screen that allows users of the room to continually interact with the system. In this example, a user may notify the system of a recent false trigger. The system may identify and the pixel associated with the false trigger and timing of the false trigger. After successive notification of a false trigger associated with a specific pixel, the system may automatically trigger filtering of the pixels without the need for recommissioning or installer assistance. The system can also utilize user feedback to identify filtered pixels that would be more beneficially be identified for non-filtering status and used in calculation for presence detection. In this example, the system may analysis user feedback for the need for lighting and identify filtered pixels that would have provide evidence of human presence. The system may automatically remove the filtering status of the pixel without the need for recommissioning or installer assistance.

Numerous embodiments will be apparent, and features described herein can be combined in any number of configurations. One example embodiment of the present invention provides a presence detection system. The system includes an IR sensor configured to scan an area and capture a plurality of IR frames. The system also includes a processor operatively coupled to the IR sensor, wherein the processor is configured to receive the plurality of IR frames, and to detect human presence and lack of human presence in the area, based on heat signature differences indicated in the IR frames. In some cases, the processor is configured to calculate a plurality of average IR frames over various time intervals, calculate a plurality of delta frames by subtracting a previously calculated average IR frame from a current average IR frame, and calculate a mask frame by summing the plurality of delta frames. In some such cases, the processor is further configured to determine whether a human presence exists in the area based on the value of the mask frame multiplied by a diminishing factor. In other such cases, the processor is further configured to compute a digital mask, the digital mask representing the mask frame in a binary format, and wherein a human presence is determined based on the value of the digital mask. In other such cases, the processor is further configured to provide a digital output based on whether a human presence exists, and the digital output is used to control at least one of an HVAC, lighting, window blinds, surveillance, and/or security system. In other such cases, the processor is further configured to clear the mask frame using a diminishing factor, wherein multiplying the mask frame by the diminishing factor clears stationary IR heat sources and non-human heat sources that cycle in temperature from the mask frame after a period of time. In other such cases, the processor is further configured to track the location of a human presence within the area based on the value of the mask frame.

Another embodiment of the present invention provides a method of detecting human occupancy. The method includes scanning an area using an IR sensor; providing a plurality of IR frames based on data captured by the IR sensor; calculating, by a processor, a plurality of average IR frames over various time intervals; calculating, by the processor, a plurality of delta frames, wherein each delta frame is the difference between a current average IR frame and a previously calculated average IR frame; calculating, by the processor, a mask frame, wherein the mask frame is a summation of the delta frames; and determining whether a human presence exists in the area based on the value of the mask frame. In some cases, detecting a plurality of IR frames further comprises combining IR sensor data with camera data. In some cases, the method further includes computing a digital mask, wherein the digital mask represents the mask frame in a binary format; and determining whether a stationary human presence exists based on the value of the digital mask. In some such cases, the method further includes calculating a background frame, wherein the background frame represents IR sensor data not represented in the digital mask; and determining a human presence by subtracting the background frame from a current average IR frame. In some cases, the method further includes determining activity within the scanned area based on the value of the delta frames. In some cases, the method further includes tracking the position of a human presence based on the value of the mask frame. In some cases, the method further includes estimating the number and location of human presence within a scanned area based on the value of the mask frame. In some cases, the method further includes clearing the mask frame using a diminishing factor, wherein multiplying the mask frame by the diminishing factor clears stationary IR heat sources and non-human heat sources that cycle in temperature from the mask frame after a period of time. In some cases, the method further includes providing a digital output based on whether a stationary presence exists, wherein the digital output is used to control at least one of an HVAC, lighting, window blinds, surveillance, and/or security system.

Another embodiment of the present invention provides a presence detection system. The system includes an IR sensor configured to scan an area and capture a plurality of IR frames; and a processor configured to: calculate a plurality of average IR frame over various time intervals; calculate a plurality of delta frames, wherein each delta frame is the difference between the current average IR frame and the previously calculated average IR frame; calculate a mask frame, wherein the mask frame is a summation of the delta frames; and determine whether a stationary presence exists based on the value of the mask frame. In some cases, the processor is further configured to provide a digital output based on whether a stationary presence exists, wherein the digital output is used to control at least one of an HVAC, lighting, window blinds, surveillance, and/or security system. In some cases, the processor is further configured to clear the mask frame using a diminishing factor, wherein multiplying the mask frame by the diminishing factor clears stationary IR heat sources and non-human heat sources that cycle in temperature from the mask frame after a period of time. In some cases, the processor is further configured to determine activity within the scanned area based on the value of the delta frames. In some cases, the processor is further configured to track the position of a human presence based on the value of the mask frame.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:
1. A presence detection system comprising:
   an Infrared (IR) sensor array configured to scan an area and capture an IR frame of pixels; and
   a processor operatively coupled to the IR sensor array, wherein the processor is configured to:
      receive the IR frame of pixels;
      receive, from a user interface, notification of a false trigger;
      identify one or more pixels associated with the false trigger;
      filter the one or more pixels associated with the false trigger from the IR frame of pixels during specific periods of time;
      calculate a plurality of average IR frames of non-filtered pixels over various time intervals;
      calculate a plurality of delta frames by subtracting a previously calculated average IR frame of non-filtered pixels from a current average IR frame of non-filtered pixels;
      calculate a mask frame by summing the plurality of delta frames; and
      detect human presence and lack of human presence in the area, based on the value of the mask frame multiplied by a diminishing factor.
2. The system of claim 1, wherein the processor is further configured to compute a digital mask, the digital mask representing the mask frame in a binary format, and wherein a human presence is determined based on the value of the digital mask.

3. The system of claim 1, wherein the processor is further configured to provide a digital output based on whether a human presence exists, and wherein the digital output is used to control at least one of an HVAC, lighting, window blinds, surveillance, and/or security system.

4. The system of claim 1 wherein the processor is further configured to receive the user input during a commissioning process.

5. The system of claim 1, wherein the processor is further configured to filter the one or more pixels associated with the false trigger from the IR frame of pixels after receiving a plurality of notifications of false triggers associated with the one or more pixels.

6. A method of commissioning human occupancy IR detection system comprising:
  scanning an area using an IR sensor array;
  providing a IR frame of pixels based on data captured by the IR sensor array;
  communicating the IR frame of pixels to a mobile device;
  receiving from the mobile device a notification of a false trigger;
  identifying one or more pixels associated with the false trigger;
  filtering the one or more pixels associated with the false trigger from the IR frame of pixels during specific periods of time;
  calculating a plurality of average IR frames of non-filtered pixels over various time intervals;
  calculating a plurality of delta frames, wherein each delta frame is the difference between a current average IR frame and a previously calculated average IR frame; and
  calculating a mask frame, wherein the mask frame is a summation of the delta frames; and
  determining whether a human presence exists in the area based on the value of the mask frame multiplied by a diminishing factor.

7. The method of claim 6 wherein communicating the IR frame of pixels to the mobile device further comprises:
  displaying the IR frame of pixels on the mobile device; and
  displaying a location of the mobile device within the IR frame of pixels.

8. The method of claim 6 wherein communicating the IR frame of pixels to the mobile device further comprises:
  capturing a camera image of the same area as the scanned area of the IR frame of pixels;
  communicating the IR frame of pixels and the camera image to the mobile device; and
  displaying the IR frame of pixels overlaid by the camera image on the mobile device.

9. The method of claim 6 further comprising determining activity within the scanned area based on the value of the delta frames of the IR frame of non-filtered pixels.

10. The method of claim 6 further comprising providing a digital output based on whether a stationary presence exists, wherein the digital output is used to control at least one of an HVAC, lighting, window blinds, surveillance, and/or security system.

11. The method of claim 6, wherein filtering the one or more pixels associated with the false trigger from the IR frame of pixels is performed after receiving a plurality of notifications of false triggers associated with the one or more pixels.

12. A presence detection system comprising:
  an IR sensor array configured to scan an area and capture an IR frame of pixels;
  an user interface configured to:
    allow a user to notify the presence detection system of a false trigger; and
  a processor configured to:
    scan the area using the IR sensor array,
    provide the IR frame of pixels based on data captured by the IR sensor array;
    identify one or more pixels associated with the false trigger;
    filter the one or more pixels associated with the false trigger from the IR frame of pixels during specific periods of time;
    calculate a plurality of average IR frames of non-filtered pixels over various time intervals;
    calculate a plurality of delta frames by subtracting a previously calculated average IR frame of non-filtered pixels from a current average IR frame of non-filtered pixels;
    calculate a mask frame by summing the plurality of delta frames; and
    determine whether a human presence exists in the area based on the value of the mask frame multiplied by a diminishing factor.

13. The system of claim 12 wherein the processor is further configured to provide a digital output based on whether a stationary presence exists, wherein the digital output is used to control at least one of an HVAC, lighting, window blinds, surveillance, and/or security system.

14. The system of claim 12 further comprising:
  a camera configured to capture the camera image of the area.

15. The system of claim 12 wherein the processor is further configured to determine activity within the scanned area based on the value of the delta frames of the IR frame of non-filtered pixels.

16. The system of claim 12, wherein the processor is further configured to filter the one or more pixels associated with the false trigger from the IR frame of pixels after receiving a plurality of notifications of false triggers associated with the one or more pixels.

* * * * *